United States Patent
Lin

(10) Patent No.: US 10,141,678 B1
(45) Date of Patent: Nov. 27, 2018

(54) CHARGING DEVICE

(71) Applicant: Yu-Tang Lin, New Taipei (TW)

(72) Inventor: Yu-Tang Lin, New Taipei (TW)

( * ) Notice: Subject to any disclaimer, the term of this patent is extended or adjusted under 35 U.S.C. 154(b) by 0 days.

(21) Appl. No.: 15/920,545

(22) Filed: Mar. 14, 2018

(30) Foreign Application Priority Data

Feb. 5, 2018 (TW) .............................. 107201755 U

(51) Int. Cl.
| | | |
|---|---|---|
| *H01R 12/00* | (2006.01) | |
| *H01R 13/516* | (2006.01) | |
| *H01R 13/512* | (2006.01) | |
| *H01R 12/70* | (2011.01) | |
| *H01R 43/20* | (2006.01) | |

(52) U.S. Cl.
CPC ....... *H01R 13/516* (2013.01); *H01R 12/7047* (2013.01); *H01R 12/7076* (2013.01); *H01R 13/512* (2013.01); *H01R 43/20* (2013.01)

(58) Field of Classification Search
None
See application file for complete search history.

(56) References Cited

U.S. PATENT DOCUMENTS

| | | | | |
|---|---|---|---|---|
| 7,212,842 B1* | 5/2007 | Seymour | ............ | G08B 13/1409 340/855.8 |
| 7,524,197 B2* | 4/2009 | Mills | ..................... | G06F 1/1632 381/334 |
| 9,857,842 B2* | 1/2018 | Eliyahu | ................. | G06F 1/1632 |
| 10,027,149 B2* | 7/2018 | Warren | ................ | H01R 31/065 |
| 10,027,152 B2* | 7/2018 | Huang | ................. | H02J 7/0045 |

* cited by examiner

*Primary Examiner* — Xuong Chung Trans
(74) *Attorney, Agent, or Firm* — Alan D. Kamrath; Kamrath IP Lawfirm, P.A.

(57) ABSTRACT

A charging device has a casing, a connector, and a supporting frame. The casing has a seat and a cover detachably deposited on the seat. The connector is connected to the casing and is deposited in the casing between the seat and the cover. The supporting frame is connected to the casing and abuts against the connector to hold the connector between the casing and the supporting frame. When the connector of the charging device needs maintenance or replacement, the supporting frame is detached from the cover and the connector is separated from the cover by a pushing force from an outer side to an inner side of the cover to replace a new connector. After replacement with the new connector, the supporting frame is connected to the cover again to finish the maintenance operation. The charging device may be detached and maintained easily.

28 Claims, 7 Drawing Sheets

CHARGING DEVICE

BACKGROUND OF THE INVENTION

1. Field of the Invention

The present invention relates to a charging device, and more particularly relates to a charging device that may be manufactured at low cost and may be detached and maintained easily.

2. Description of Related Art

A conventional charging device has a casing and a linking segment. The linking segment is mounted to the casing securely, and has an external terminal and an internal terminal. The external terminal of the linking segment is electrically connected to a battery module. The internal terminal of the linking segment is connected to an electronic module deposited in the casing. Then, the battery module can be charged by electric power that is transmitted from the electronic module via the internal terminal and the external terminal to the battery module.

The linking segment of the conventional charging device is securely deposited on the casing. When the linking segment is broken and cannot successfully transmit electricity to the battery module, this will influence the charging effect of the conventional charging module. In addition, a user cannot replace the broken linking segment with a new one since the linking segment is securely deposited on the casing, and this is difficult to repair the linking segment of the conventional charging device and will limit the practicality of the conventional charging device.

To overcome the shortcomings, the present invention provides a charging device to mitigate or obviate the aforementioned problems.

SUMMARY OF THE INVENTION

The main objective of the present invention is to provide a charging device that may be manufactured at low cost and may be detached and maintained easily.

The charging device in accordance with the present invention has a casing, a connector, and a supporting frame. The casing has a seat and a cover detachably deposited on the seat. The connector is connected to the casing and is deposited in the casing between the seat and the cover. The supporting frame is connected to the casing and abuts against the connector to hold the connector between the casing and the supporting frame. When the connector of the charging device needs maintenance or replacement, the supporting frame is detached from the cover and the connector is separated from the cover by a pushing force from an outer side to an inner side of the cover to replace the connector with a new one. After replacement with the new connector, the supporting frame is connected to the cover again to finish the maintenance operation. The charging device may be manufactured at low cost and may be detached and maintained easily.

Other objects, advantages and novel features of the invention will become more apparent from the following detailed description when taken in conjunction with the accompanying drawings.

DETAILED DESCRIPTION OF THE PREFERRED EMBODIMENT

Figure 1:
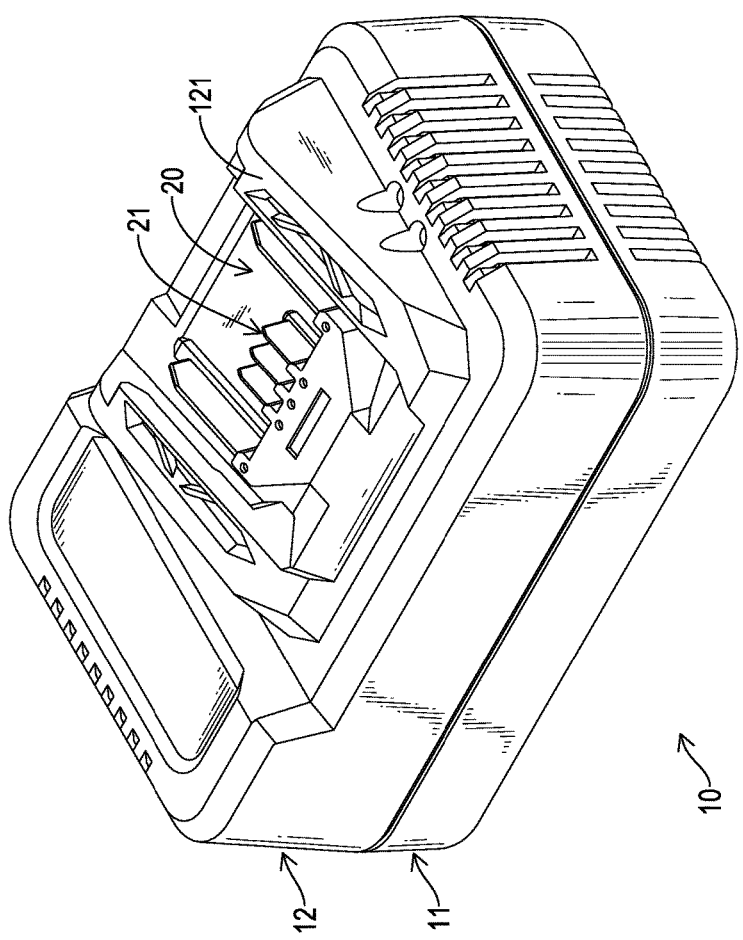
FIG. 1 is a perspective view of a charging device in accordance with the present invention.
Figure 2:
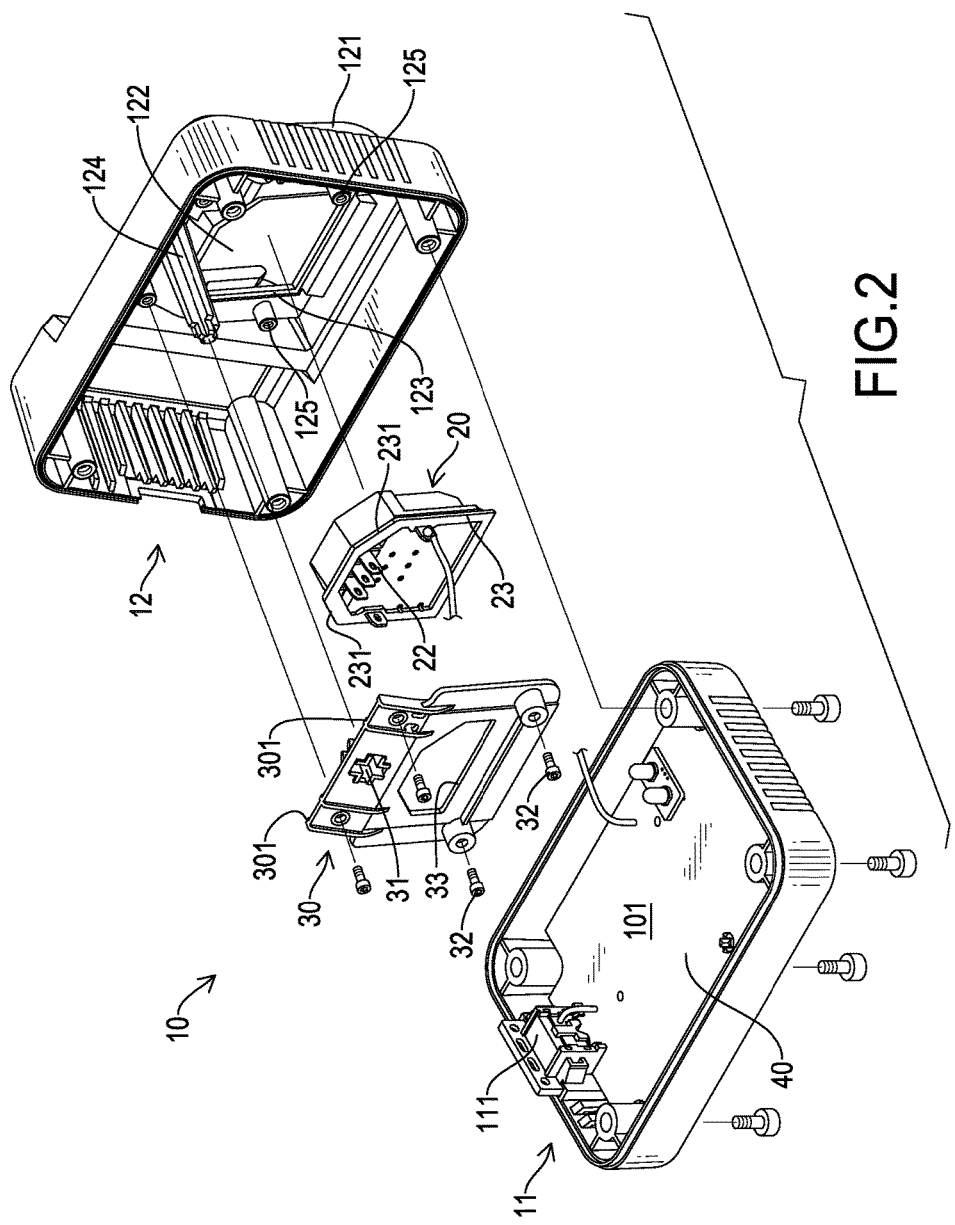
FIG. 2 is an exploded perspective view of the charging device in FIG. 1.

With reference to FIGS. 1 and 2, a charging device in accordance with the present invention comprises a casing 10, a connector 20, a supporting frame 30, and an electronic module 40.

Figure 7:
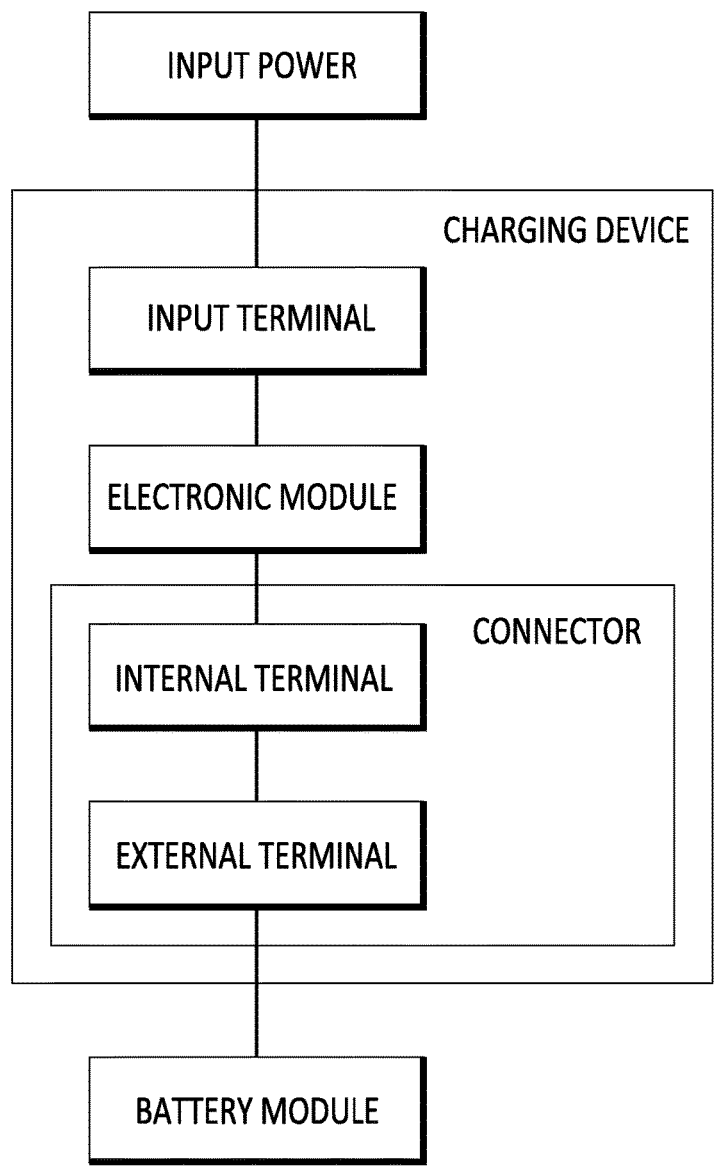
FIG. 7 is a block diagram of the charging device in FIG. 1.

The casing 10 has a receiving chamber 101, a seat 11, and a cover 12. The receiving chamber 101 is formed in the casing 10. The seat 11 has a sidewall and an input terminal 111. The input terminal 111 is deposited on the sidewall of the seat 11 to electrically connect an outer side to an inner side of the sidewall of the seat 11, and is electrically connected to an input power via the seat 11 from the outer side of the sidewall of the seat 11 as shown in FIG. 7. The cover 12 is detachably deposited on the seat 11 to enable the receiving chamber 101 of the casing 11 to form between the cover 12 and the seat 11. The cover 12 has a top side, an inner side, a carrying portion 121, a charging port 122, an abutting surface 123, a positioning portion 124, and four fixing portions 125. The carrying portion 121 is formed on and protrudes partially from the top side of the cover 12 and has an inclined plane deposited on a top of the carrying portion 121. The charging port 122 is formed through the inclined plane of the cover 12 and communicates with the receiving chamber 101 of the casing 10. The abutting surface 123 is deposited on the inner side of the cover 12 and surrounds the charging port 122.

The positioning portion 124 may be a post, is formed on and protrudes from the inner side of the cover 12 toward the seat 11, and is deposited adjacent to the abutting surface 123 of the cover 12 at a spaced interval. The positioning portion 124 of the cover 12 has a cross-shaped cross section. The four fixing portions 125 are formed on and protrude from the inner side of the cover 12 adjacent to the abutting surface 123 at spaced intervals. Furthermore, the four fixing portions 125 are deposited on the cover 12 at spaced intervals to the positioning portion 124. Two of the four fixing portions 125 are deposited on both sides of the positioning portion 124, and the other two of the four fixing portions 125 are deposited on the cover 12 adjacent to the abutting surface 123 away from the positioning portion 124.

Figure 6:
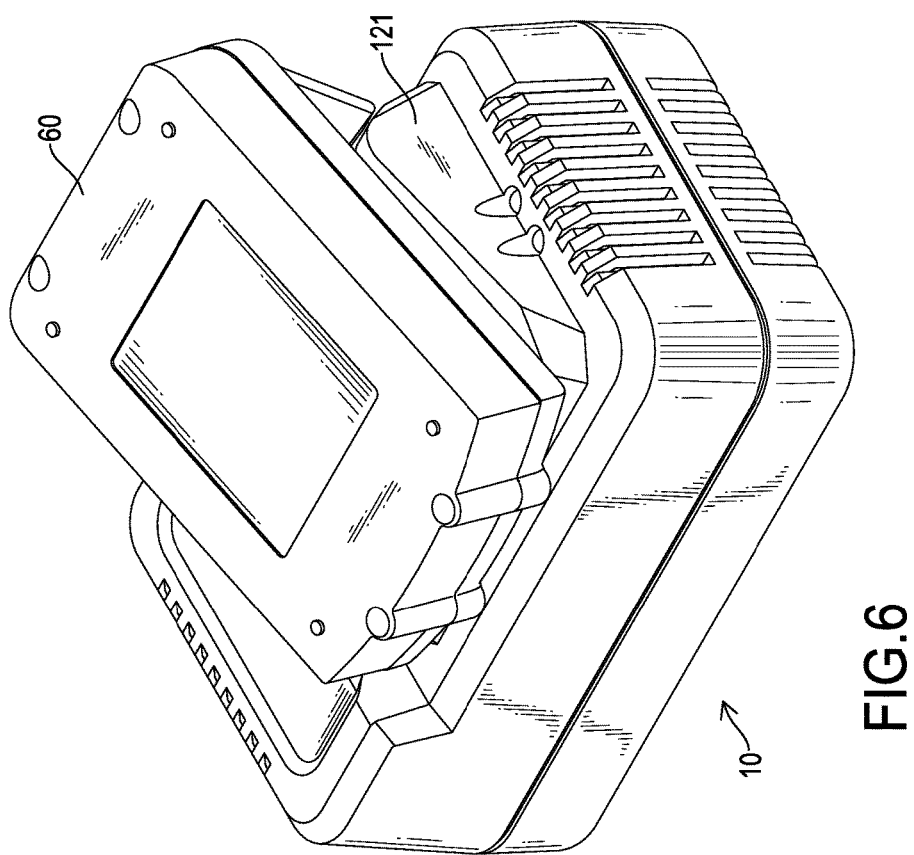
FIG. 6 is an operational perspective view of the charging device in FIG. 1, shown with a battery module deposited thereon.

With reference to FIGS. 1 to 4, the connector 20 may be a square lid, is detachably connected to the cover 12 of the casing 10, faces the seat 11 of the casing 10, and has a top side, a bottom side, an external terminal 21, an internal terminal 22, and a connecting flange 23. The top side of the connector 20 extends out of the cover 12 via the charging port 122 of the cover 12. The bottom side of the connector 20 is opposite to the top side of the connector 20. The external terminal 21 is deposited on the top side of the connector 20, is opposite to the seat 11, and has multiple conductive sheets deposited at spaced intervals on the top side of the connector 20 to connect with a battery module 60 as shown in FIG. 6.

The internal terminal 22 is deposited on the bottom side of the connector 20, faces the seat 11 of the casing 10, is electrically connected to the external terminal 21, and has multiple conductive sheets deposited at spaced intervals on the bottom side of the connector 20 and electrically and respectively connected to the conductive sheets of the external terminal 21.

Figure 4:
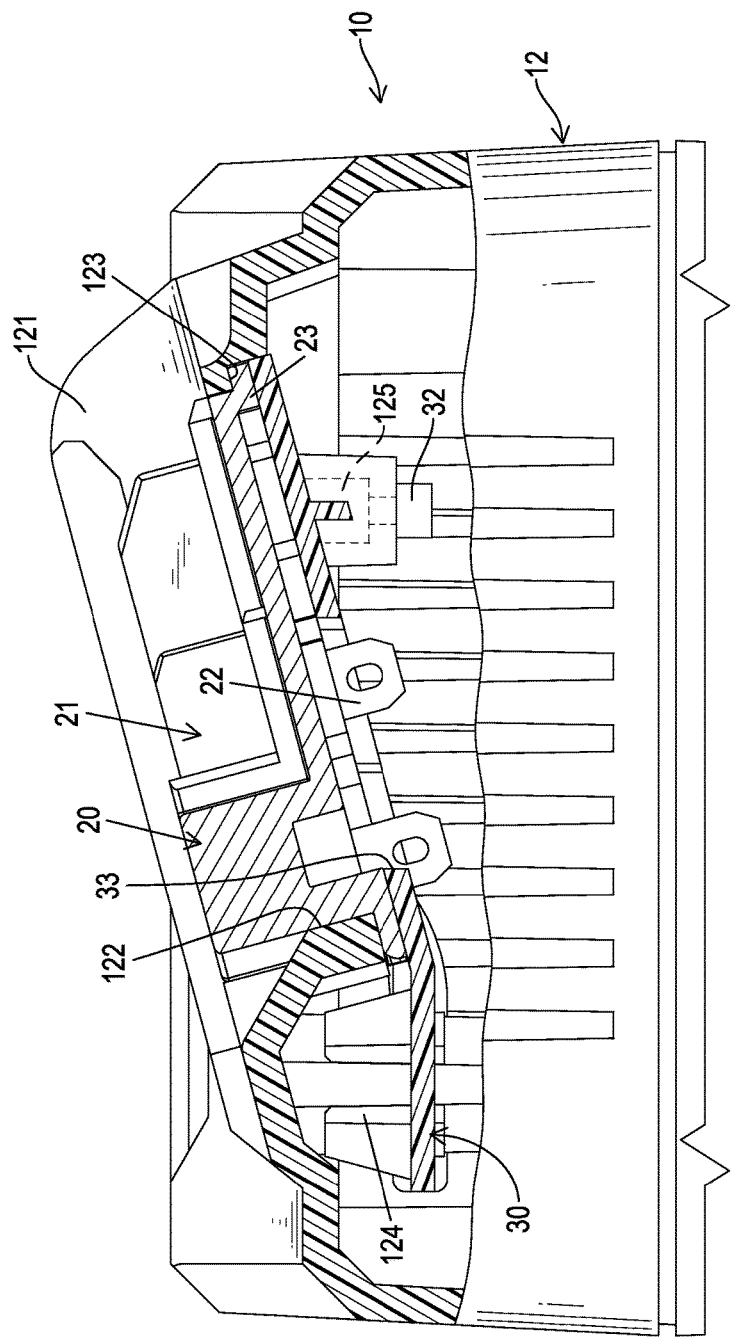
FIG. 4 is an enlarged side view in partial section of the charging device in FIG. 1.

The connecting flange 23 is formed on and protrudes annularly from the bottom side of the connector 20, and abuts against the abutting surface 123 of the cover 12 as shown in FIG. 4 to provide a positioning effect to the connector 20. Then, the connector 20 cannot separate from the cover 12 via the charging port 122, and an outer periphery of the connecting flange 23 does not exceed an outer periphery of the abutting surface 123. Furthermore, the connecting flange 23 has two beveled edges 231 deposited on the connecting flange 23 adjacent to the positioning portion 124 at a spaced interval.

With reference to FIGS. 2 to 5, the supporting frame 30 is detachably connected to the cover 12 of the casing 10, abuts against the connector 20 to hold the connector 20 between the cover 12 and the supporting frame 30, and has a top side, a bottom side, a fixing hole 31, multiple protruding ribs 301, four fasteners 32, and a linking hole 33. The top side of the supporting frame 30 abuts the connecting flange 23 of the connector 20. The bottom side of the supporting frame 30 faces the seat 11 of the casing 10. The fixing hole 31 is formed through the top side and the bottom side of the supporting frame 30 corresponding to the positioning portion 124 of the cover 12, may be a cross-shaped through hole, and is disposed around the positioning portion 124 to hold the connector 20 securely with the supporting frame 30. In addition, the positioning portion 124 is inserted through the supporting frame 30 via the fixing hole 31 and extends toward the seat 11.

Figure 3:
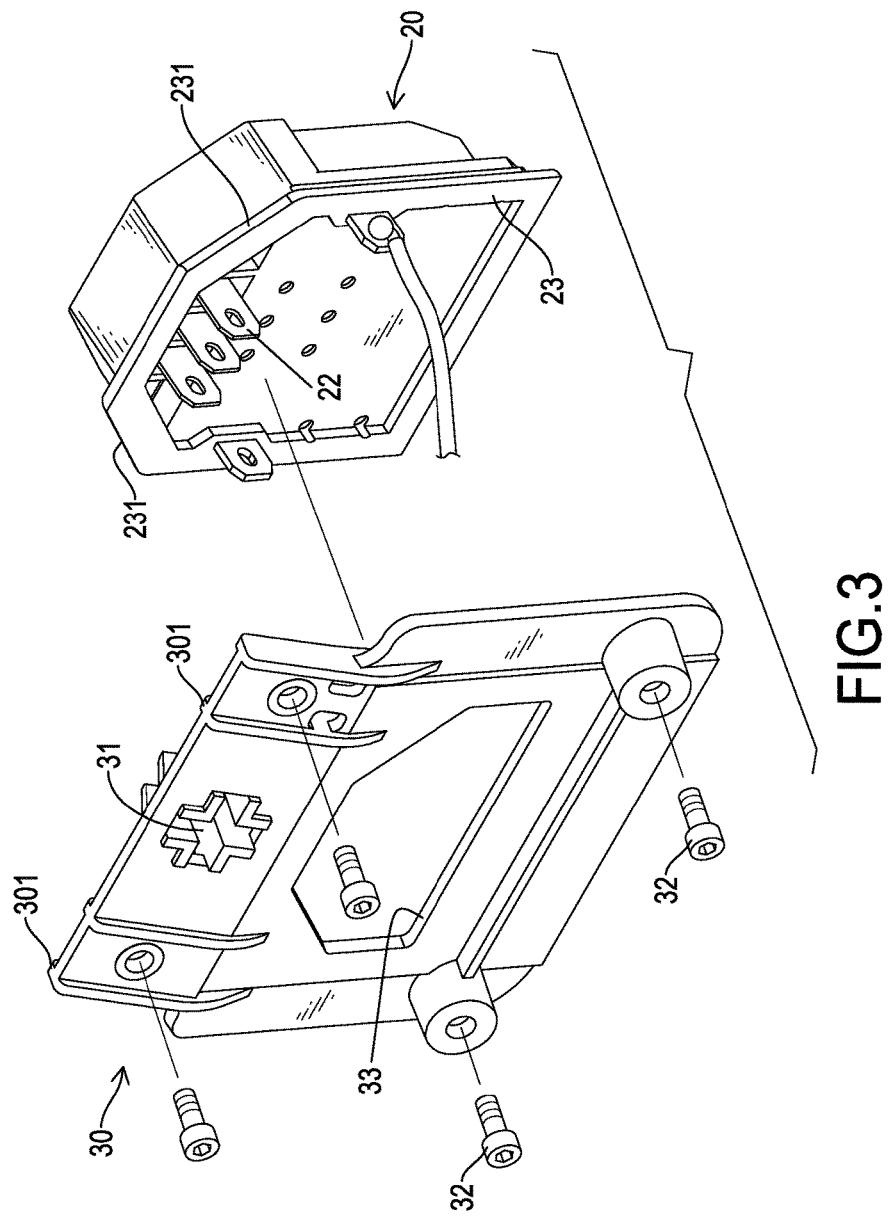
FIG. 3 is an enlarged and exploded perspective view of the charging device in FIG. 2.
Figure 5:
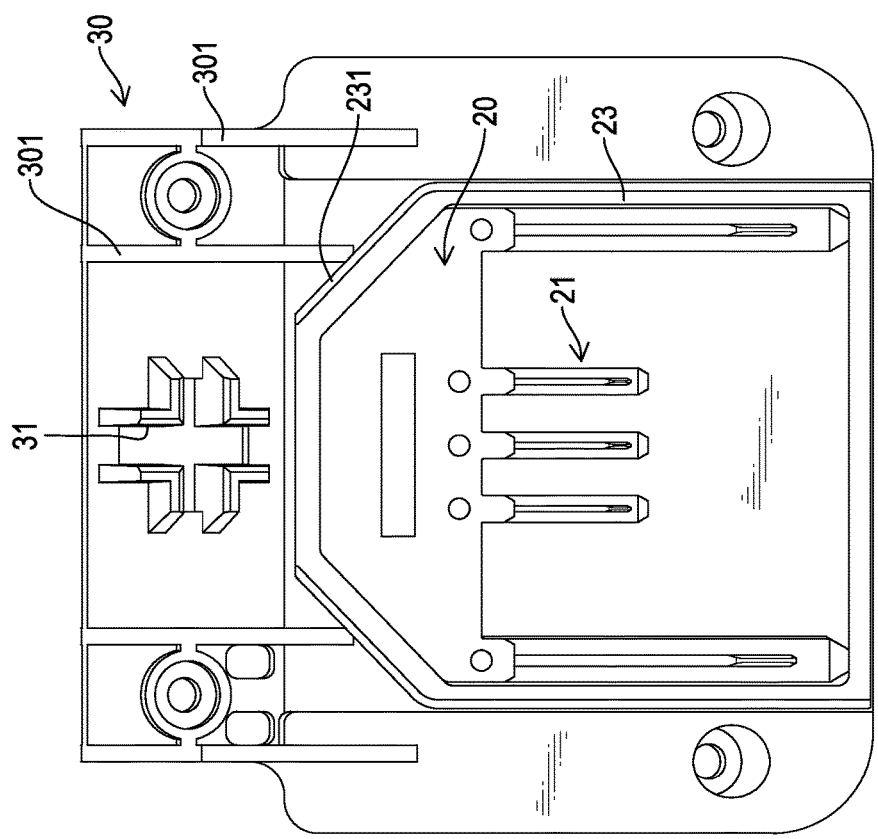
FIG. 5 is an enlarged side view of a connector and a supporting frame of the charging device in FIG. 1.

With reference to FIGS. 3 and 5, the protruding ribs 301 have different lengths, and are deposited on the supporting frame 30 beside the fixing hole 31 at spaced intervals. The innermost two of the protruding ribs 301 relative to the fixing hole 31 have an equal length, and the outermost two of the protruding ribs 301 relative to the fixing hole 31 have an equal length and are longer than the innermost two of the protruding ribs 301. Then, the protruding ribs 301 that are deposited at a same side of the fixing hole 31 have different lengths, thereby enabling the corresponding protruding ribs 301 to fit with or abut against one of the two beveled edges 231 of the connecting flange 23 when the connector 20 is connected to the supporting frame 30, and this may provide a positioning effect to the connector 20 and the supporting frame 30.

With reference to FIGS. 2 to 4, each one of the four fasteners 32 may be a self-tapping screw, extends through the top side and the bottom side of the supporting frame 30, and is connected securely to one of the four fixing portions 125 of the cover 12 to connect the supporting frame 30 with the cover 12 of the casing 10 via the fixing hole 31 and the fasteners 32. Then, the connector 20 is held firmly between the supporting frame 30 and the cover 12 of the casing 10. The linking hole 33 is formed through the top side and the bottom side of the supporting frame 30 to enable the internal terminal 22 to extend toward the seat 11 via the linking hole 33.

With further reference to FIG. 2, the electronic module 40 may be a circuit board, is deposited in the casing 10, and is electrically connected to the input terminal 111 and the internal terminal 22 to form a charging path between the casing 10, the connector 20, and the electronic module 40.

With reference to FIGS. 6 and 7, in use, the charging device in accordance with the present invention is used to charge a battery module 60, the battery module 60 is put on the carrying portion 121 of the cover 12, and a charging terminal of the battery module 60 electrically abuts and connects to the external terminal 21 of the connector 20. Then, the electric power is transmitted from an external input power to the battery module 60 via the input terminal 111, the electronic module 40, the internal terminal 22, the external terminal 21, and the charging terminal of the battery module 60.

According to the features and structural relationships of the charging device in accordance with the present invention, when the connector 20 is broken and needs replacement, the cover 12 is detached from the seat 11, and each one of the fasteners 32 is loosened from the cover 12 to separate the supporting frame 30 from the cover 12. Then, the broken connector 20 that is deposited between the cover 12 and the supporting frame 30 can be separated from the cover 12 by a pushing force applied on the connector 20 from the top side of the cover 12 to the inner side of the cover 12, and a new connector 20 is connected to the cover 12 and the supporting frame 30 again to complete the maintenance process, and this is convenient and easy in use. In addition, since the connector 20 of the present invention can be manufactured by a mold that is used to produce a connector of a riveter, this may reduce the cost of manufacturing the connector 20 of the charging device of the present invention. Furthermore, the connector 20 can be separated for maintenance or replacement, and all the other components of the charging device of the present invention can be used repeatedly when the connector 20 is broken, so this also can decrease the cost of using the charging device.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A charging device having
 a casing having
  a side;
  an inner side;
  a charging port formed through the side of the casing;
  a positioning portion formed on and protruding from the inner side of the casing adjacent to the charging port and having a shape; and
  at least one fixing portion deposited on the inner side of the casing adjacent to the charging port and deposited at a spaced interval to the positioning portion;
 a connector connected to the casing, deposited on the inner side of the casing, and having
  an external terminal extending out of the casing via the charging port; and
  an internal terminal deposited on the connector opposite to the external terminal and electrically connected to the external terminal; and
 a supporting frame detachably connected to the casing, abutting against the connector to hold the connector between the casing and the supporting frame, and having
  a fixing hole formed through the supporting frame and having a shape corresponding to the shape of the positioning portion, and the fixing hole disposed around the positioning portion when the supporting frame abuts against the connector;

at least one fastener extending through the supporting frame and connected securely to the at least one fixing portion of the casing; and a linking hole formed through the supporting frame to enable the internal terminal to extend out of the supporting frame via the linking hole.

2. The charging device as claimed in claim 1, wherein the positioning portion of the casing is a post with a cross-shaped cross section; and the fixing hole of the supporting frame is a cross-shaped through hole corresponding to the cross-shaped cross section of the positioning portion.

3. The charging device as claimed in claim 1, wherein the casing has four said fixing portions deposited on the inner side of the casing at spaced intervals and adjacent to the charging port of the casing; and the supporting frame has four said fasteners extending through the supporting frame and respectively and securely connected to the four fixing portions of the casing.

4. The charging device as claimed in claim 2, wherein the casing has four said fixing portions deposited on the inner side of the casing at spaced intervals and adjacent to the charging port of the casing; and the supporting frame has four said fasteners extending through the supporting frame and respectively and securely connected to the four fixing portions of the casing.

5. The charging device as claimed in claim 1, wherein each one of the at least one fastener is a self-tapping screw.

6. The charging device as claimed in claim 2, wherein each one of the at least one fastener is a self-tapping screw.

7. The charging device as claimed in claim 3, wherein each one of the fasteners is a self-tapping screw.

8. The charging device as claimed in claim 4, wherein each one of the fasteners is a self-tapping screw.

9. The charging device as claimed in claim 1, wherein the connector has two beveled edges deposited on the connector adjacent to the positioning portion at a spaced interval; and the supporting frame has two protruding ribs with different lengths deposited on the supporting frame at a spaced interval and at each one of two sides of the fixing hole to fit with one of the beveled edges of the connector, and one of the two protruding ribs of the supporting frame at each one of the two sides of the fixing hole abuts against one of the beveled edges of the connector.

10. The charging device as claimed in claim 2, wherein the connector has two beveled edges deposited on the connector adjacent to the positioning portion at a spaced interval; and the supporting frame has two protruding ribs with different lengths deposited on the supporting frame at a spaced interval and at each one of two sides of the fixing hole to fit with one of the beveled edges of the connector, and one of the two protruding ribs of the supporting frame at each one of the two sides of the fixing hole abuts against one of the beveled edges of the connector.

11. The charging device as claimed in claim 3, wherein the connector has two beveled edges deposited on the connector adjacent to the positioning portion at a spaced interval; and the supporting frame has two protruding ribs with different lengths deposited on the supporting frame at a spaced interval and at each one of two sides of the fixing hole to fit with one of the beveled edges of the connector, and one of the two protruding ribs of the supporting frame at each one of the two sides of the fixing hole abuts against one of the beveled edges of the connector.

12. The charging device as claimed in claim 4, wherein the connector has two beveled edges deposited on the connector adjacent to the positioning portion at a spaced interval; and the supporting frame has two protruding ribs with different lengths deposited on the supporting frame at a spaced interval and at each one of two sides of the fixing hole to fit with one of the beveled edges of the connector, and one of the two protruding ribs of the supporting frame at each one of the two sides of the fixing hole abuts against one of the beveled edges of the connector.

13. The charging device as claimed in claim 1, wherein the casing has an abutting surface deposited on the inner side of the casing, surrounding the charging port, deposited at a spaced interval to the positioning portion, and having an outer periphery; and the connector has a connecting flange formed on and protruding annularly from a bottom side of the connector opposite to the external terminal, abutting against the abutting surface of the casing, and having an outer periphery without exceeding the outer periphery of the abutting surface of the casing.

14. The charging device as claimed in claim 2, wherein the casing has an abutting surface deposited on the inner side of the casing, surrounding the charging port, deposited at a spaced interval to the positioning portion, and having an outer periphery; and the connector has a connecting flange formed on and protruding annularly from a bottom side of the connector opposite to the external terminal, abutting against the abutting surface of the casing, and having an outer periphery without exceeding the outer periphery of the abutting surface of the casing.

15. The charging device as claimed in claim 3, wherein the casing has an abutting surface deposited on the inner side of the casing, surrounding the charging port, deposited at a spaced interval to the positioning portion, and having an outer periphery; and the connector has a connecting flange formed on and protruding annularly from a bottom side of the connector opposite to the external terminal, abutting against the abutting surface of the casing, and having an outer periphery without exceeding the outer periphery of the abutting surface of the casing.

16. The charging device as claimed in claim 4, wherein the casing has an abutting surface deposited on the inner side of the casing, surrounding the charging port, deposited at a spaced interval to the positioning portion, having an outer periphery; and the connector has a connecting flange formed on and protruding annularly from a bottom side of the connector opposite to the external terminal, abutting against the abutting surface of the casing, and having an outer periphery without exceeding the outer periphery of the abutting surface of the casing.

17. The charging device as claimed in claim 13, wherein the casing has a seat and a cover detachably deposited on the seat; and the charging port, the positioning portion and each one of the at least one fixing portion are deposited on the cover of the casing.

18. The charging device as claimed in claim 14, wherein the casing has a seat and a cover detachably deposited on the seat; and the charging port, the positioning portion and each one of the at least one fixing portion are deposited on the cover of the casing.

19. The charging device as claimed in claim 15, wherein the casing has a seat and a cover detachably deposited on the seat; and the charging port, the positioning portion and each one of the fixing portions are deposited on the cover of the casing.

20. The charging device as claimed in claim 16, wherein the casing has a seat and a cover detachably deposited on the seat; and the charging port, the positioning portion and each one of the fixing portions are deposited on the cover of the casing.

21. The charging device as claimed in claim 17, wherein the charging device has an input terminal deposited on a sidewall of the seat to electrically connect an outer side to an inner side of the sidewall of the seat; and an electronic module deposited in the casing between the seat and the supporting frame, and electrically connected to the input terminal and the internal terminal of the connector.

22. The charging device as claimed in claim 18, wherein the charging device has an input terminal deposited on a sidewall of the seat to electrically connect an outer side to an inner side of the sidewall of the seat; and an electronic module deposited in the casing between the seat and the supporting frame, and electrically connected to the input terminal and the internal terminal of the connector.

23. The charging device as claimed in claim 19, wherein the charging device has an input terminal deposited on a sidewall of the seat to electrically connect an outer side to an inner side of the sidewall of the seat; and an electronic module deposited in the casing between the seat and the supporting frame, and electrically connected to the input terminal and the internal terminal of the connector.

24. The charging device as claimed in claim 20, wherein the charging device has an input terminal deposited on a sidewall of the seat to electrically connect an outer side to an inner side of the sidewall of the seat; and an electronic module deposited in the casing between the seat and the supporting frame, and electrically connected to the input terminal and the internal terminal of the connector.

25. The charging device as claimed in claim 21, wherein the electronic module is a circuit board.

26. The charging device as claimed in claim 22, wherein the electronic module is a circuit board.

27. The charging device as claimed in claim 23, wherein the electronic module is a circuit board.

28. The charging device as claimed in claim 24, wherein the electronic module is a circuit board.

* * * * *